United States Patent [19]

Wolgemuth et al.

[11] 3,953,387

[45] Apr. 27, 1976

[54] STABILIZED THERMOPLASTIC POLYURETHANES

[75] Inventors: Larry G. Wolgemuth, Cherry Hill; Benjamin C. Wilbur, Williamstown, both of N.J.

[73] Assignee: Atlantic Richfield Company, Los Angeles, Calif.

[22] Filed: Nov. 6, 1974

[21] Appl. No.: 521,213

[52] U.S. Cl. .................... 260/18 TN; 260/45.85 R; 260/45.85 T
[51] Int. Cl.² .................................................. C08K 5/13
[58] Field of Search ............ 260/45.85 R, 45.85 T, 260/18 TN, 45.95 H, 45.95 R

[56] References Cited
UNITED STATES PATENTS

| | | | |
|---|---|---|---|
| 3,087,900 | 4/1963 | Brown | 260/45.85 R |
| 3,087,901 | 4/1963 | Brown | 260/45.85 T |
| 3,179,625 | 4/1965 | Ehrhart | 260/45.85 |
| 3,351,608 | 11/1967 | Oertel | 260/45.85 R |
| 3,385,820 | 5/1968 | Finlay | 260/45.95 R |
| 3,395,114 | 7/1968 | Smith | 260/45.95 R |
| 3,401,145 | 9/1968 | Rogers | 260/45.95 |
| 3,446,771 | 5/1969 | Matsubayashi | 260/48.85 |
| 3,494,880 | 2/1970 | Austin | 260/45.95 H |
| 3,538,046 | 11/1970 | Oertel | 260/45.95 H |
| 3,637,553 | 1/1972 | Keberle | 260/45.95 H |

*Primary Examiner*—Paul R. Michl
*Attorney, Agent, or Firm*—Coleman R. Reap

[57] ABSTRACT

Thermoplastic polyurethanes prepared by means of an organotin catalyst and particularly those derived from cyclic nitrile compounds and polyhydroxyl-containing compounds are stabilized against thermal degradation by incorporating therein a stabilizer system comprised of a combination of a carboxylic acid and a sterically hindered phenolic compound.

7 Claims, No Drawings

STABILIZED THERMOPLASTIC POLYURETHANES

BACKGROUND OF THE INVENTION

This invention relates to stabilized thermoplastic polyurethanes, and particularly to stabilized thermoplastic polyurethanes prepared by the condensation-rearrangement reaction between cyclic nitrile compounds and polyols by means of an organotin catalyst.

It is well known that thermoplastic polyurethane compositions are susceptible to thermal degradation when they are exposed to elevated temperatures, resulting in a loss in molecular weight and a reduction in the value of other physical properties of the compositions. Since they are often subjected to high temperatures during post-polymerization processes such as milling and molding it is highly desirable to eliminate or significantly reduce the thermal degradation of these compositions. Many attempts have been made to provide protection against degradation by the addition of various antioxidants, however, the use of conventional stabilizers has been found to be unsatisfactory when the thermoplastic polyurethane is prepared by means of organotin catalysts, especially when the polyurethane is prepared from cyclic nitrile compounds and polyols. Residual organotin compounds remaining in the polyurethane apparently contribute significantly to the thermal instability of the polyurethane.

SUMMARY OF THE INVENTION

Thermally stabilized polyurethane compositions have now been discovered which have reduced sensitivity to elevated temperatures and which consequently will not readily undergo thermal degradation.

Therefore, it is an object of this invention to provide a stabilizing system for inhibiting the thermal degradation of thermoplastic polyurethanes. It is another object of the invention to provide a stabilizer system to inhibit thermal degradation of thermoplastic polyurethanes prepared by means of organotin compounds. It is another object of the invention to improve the thermal stability of thermoplastic urethanes prepared from cyclic nitrile compounds and polyols. It is another object of the invention to inhibit degradation of the aforementioned polyurethanes during milling and molding processes carried out at elevated temperatures. These and other objectives of the invention will become apparent from the specification.

According to the invention, the thermal stability of thermoplastic polyurethane compositions which contain organotin compounds, for example as a result of the use of organotin catalysts in the preparation of the polyurethane, is improved by incorporating into the polyurethane composition small amounts of a mixture of a saturated mono- or difunctional carboxylic acid component containing 2 to 24 carbon atoms and a sterically hindered phenol compound. The preferred saturated carboxylic acids are the monofunctional carboxylic acids containing 12 to 18 carbon atoms and the preferred sterically hindered phenols are those containing a tertiary alkyl group in at least one of the ortho positions with respect to the position of the hydroxyl group. The stabilizer system is particularly effective in stabilizing thermoplastic polyurethanes prepared from the reaction of cyclic nitrile compounds and polyols.

DESCRIPTION OF THE INVENTION

The thermoplastic polyurethanes which are to be stabilized according to the invention can be prepared by any of the well known methods using well known starting materials. They are commonly prepared by reacting a polyhydroxyl compound having a functionality of about 2 hydroxyl groups per molecule with a diisocyanate or a difunctional cyclic nitrile compound.

The polyhydroxyl compounds may be low molecular weight diols or higher molecular weight polyols including polymeric polyols such as polyether polyols, and polyester polyols, having molecular weight of up to about 5,000, preferably about 500 to 2,000, and an average of about 2 hydroxyl groups per molecule.

The polyether polyols useful in preparing thermoplastic polyurethanes are generally prepared by the polymerization of cyclic ethers such as alkylene oxides or dioxolane or by the condensation of glycols. They are sometimes known as polyalkylene glycols, polyalkylene oxide glycols, polyglycols or polyoxyalkylene diols. They may be represented by the formula $HO(RO)_nH$, in which R stands for an alkylene radical and n is an integer greater than 1. In the polyethers preferred in this invention, n is sufficiently large that the polyalkylene ether glycol has a molecular weight of at least 500. Not all the alkylene radicals present need be the same. Polyglycols formed by the copolymerization of a mixture of different alkylene oxides or glycols may be used, or the polyglycol may be derived from a cyclic ether such as dioxolane, which results in a product having the formula $HO(CH_2OC_2H_4O)_nH$. Examples of compounds which contain diverse alkylene radicals and which are useful in the preparation of elastomers are those polyethers described in U.S. Pat. No. 2,492,955 to Ballard et al. which have molecular weights in the desired range.

When polyester polyols are employed they are usually linear and hydroxyl terminated. Suitable polyester polyols include polycaprolactones and polyesterpolyols. The polycaprolactones are prepared by condensing caprolactone in the presence of minor amounts of difunctional active hydrogen compounds such as water or low molecular weight glycols. Polyesterpolyols based on dicarboxylic acids and glycols can be derived by well known esterification or trans-esterification procedures. Generally the polyester glycols are obtained by esterification of a dicarboxylic acid or an anhydride thereof with a glycol, preferably one having its hydroxyl groups on terminal carbon atoms. Glycols represented by the structure $HO(CH_2)_xOH$ wherein x is 2 10 (preferably 2 to 6), such as ethylene glycol, 1,3-propanediol, 1,4-butanediol, 1,5-pentanediol, 1,6-hexanediol, and the like and mixtures thereof are preferred. Examples of aromatic diols are 1,4-benzene diol, 2,4-toluene diol, etc. Examples of the aliphatic, dibasic carboxylic acids utilized in preparing the polyester are adipic, succinic, pimelic, suberic, azelaic, sebacic and the like, or their anhydrides. These dicarboxylic acids are preferred and may be represented by the formula $HOOC(CH_2)_n COOH$, wherein n is a number from 0 to 8, preferably 4 to 6. Examples of aromatic dicarboxylic acids or anhydrides are terephthalic acid, isophthalic acid, phthalic anhydride, etc. In the esterification reactions, molar ratios of more than one mol of glycol per mol of acid are preferred so as to obtain essentially linear chains containing a preponderance of terminal hydroxyl groups The methods and details of manufacturing such polyesters are well known.

Diols useful in preparing the thermoplastic polyurethane elastomer of this invention are diols having a low molecular weight such as below 250 and having only primary or secondary aliphatic hydroxyl groups. Useful glycols in this category include the lower molecular weight glycols such as ethylene, propylene, butylene, pentylene, and the higher or substituted alkylenediols and various hydroxyl-substituted aryl compounds. Particularly useful are 1,2-propanediol; 1,4-butanediol; 1,3-propanediol; 1,5-pentanediol; neopentyl glycol; 2,2 bis (4-hydroxycyclohexane) propane; cis or trans 1,4-dihydroxy cyclohexane; bis(hydroxyethyl)isophthalate; bis(hydroxypropyl) isophthalate; ethylene oxide capped hydroquinone; and 1,4-di($\beta$-hydroxyethoxy)-benzene. Mixtures of two or more diols such as equimolar mixtures of 1,3-propanediol and 1,4-butanediol may also be used.

When diisocyanates are used in the preparation of the polyurethanes being stabilized they are often aliphatic, araliphatic or aromatic. Aromatic diisocyanates are generally preferred in the preparation of polyurethanes by conventional procedures since they are less hazardous to handle than aliphatic diisocyanates. Preferred aromatic diisocyanates include tolylene diisocyanate and diphenylmethane-4,4'-diisocyanate.

When the thermoplastic polyurethanes are prepared from a cyclic nitrile compound and a polyol, the cyclic nitrile compounds employed generally have the structure

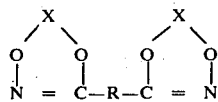

wherein X is carbonyl,

sulfite,

or oxalyl,

and R is a divalent organic radical free of nucleophilic groups and other groups which would interfere with the desired reaction and is preferably a hydrocarbon having from 2 to 50 carbon atoms. R can be saturated aliphatic, including cycloaliphatic or aromatic and often contains from 2 to 18 carbon atoms. When R is saturated aliphatic it often contains from 2 to 12 carbon atoms and when it is saturated cycloaliphatic it often contains from 5 to 7 ring carbon atoms. When R is aromatic it preferably contains 1 to 3 rings, fused or non-fused. R is generally a saturated alkylene hydrocarbon radical and may be straight or branched chain.

Examples of cyclic nitrile compounds useful in this invention include such compounds as malonodi (nitrile carbonate); succinodi (nitrile sulfite); glutarodi (nitrile oxalate); adipodi (nitrile carbonate); pimelodi (nitrile sulfite); suberodi (nitrile carbonate); azeloadi (nitrile oxalate); sebacodi (nitrile carbonate); fumarodi (nitrile carbonate); itaconodi (nitrile sulfite); cyclohexanedi (nitrile oxalate) naphthalene-1,4-di (nitrile carbonate); japanodi (nitrile carbonate); 2,2-diphenylpropane-4,4'-di(nitrile carbonate); isophthalodi (nitrile carbonate); and terephthalodi (nitrile sulfite). A preferred cyclic nitrile carbonate compound is adipodi (nitrile carbonate).

The ratio of isocyanate or cyclic nitrile groups to hydroxyl groups of the hydroxyl-containing compound is usually in the range of about 0.8 to 2:1; however, it is often preferred when preparing thermoplastic elastomers that the ratio of isocyanate or cyclic nitrile groups to hydroxy-containing groups be maintained near 1:1. When mixtures of different hydroxyl-containing compounds are employed in the reaction, they can be present in any desired mole ratio.

The preparation of the thermoplastic polyurethane polymers stabilized by the invention is not critical and any of the well known methods, such as the one-shot, quasi-prepolymer, and full prepolymer methods, can be used. The preparation of thermoplastic polyurethanes is thoroughly described in the literature and no further description is required here.

The stabilizer system is particularly effective in stabilizing polyurethanes containing small amounts of organotin compounds. These compounds are usually present as residue when organotin compounds are used as the catalyst or cocatalyst in the preparation of the thermoplastic polyurethanes. U.S. Pat. Nos. 3,652,507 and 3,702,320, the disclosures of which are incorporated herein by reference, describe the use of organotin catalysts in the preparation of polyurethanes from cyclic nitrile compounds and polyols. These catalysts are ordinarily used at concentrations of about 0.005 to 2.0 parts by weight per 100 parts by weight of total hydroxyl-containing compound used in the reaction mixture. The amount of organotin compound remaining in the product will vary depending on the method of polymerization and product purification (if any) employed but it is generally less than the amount of organotin compound used in the preparation of the polymer. It is not known with certainty but it is believed that residual organotin compound present in the polymeric product contributes to the thermal instability of the product. In any event it has been observed that the thermal stability of organotin-catalyzed thermoplastic polyurethanes is improved by the incorporation of small amounts of the stabilizer system of the invention into these polyurethanes.

The stabilizer system of the invention is comprised of a saturated carboxylic acid component and a sterically hindered phenol. The saturated carboxylic acid component can contain from 2 to 24 carbon atoms and can be either monofunctional or difunctional. The carboxylic acid component can also be a mixture of two or more carboxylic acids. As can readily be appreciated the carboxylic acid component must be free of substituents which would substantially interfere with the performance of the stabilizer or which would otherwise adversely affect the product. Saturated carboxylic acids typical of those usable in the invention are monofunctional acids, such as acetic acid, pentanoic acid, octanoic acid, decanoic lauric acid, palmitic acid, stearic acid, behinic acid, etc., and difunctional acids, such as, oxalic acid, succinic acid, adipic acid, decane dicarboxylic acid, eicosane dicarboxylic acid, etc. In a preferred embodiment the saturated carboxylic acid component is monofunctional and contains 12 to 18 carbon atoms. Examples of preferred carboxylic acids are lauric acid, palmitic acid and stearic acid. The carboxylic acid component may also contain small amounts of ethylenically unsaturated carboxylic acids. For example, commercial grade stearic acid, which often contains about 50% by weight stearic acid, 45% by weight palmitic acid and about 5 % oleic acid, can be used as the carboxylic acid component.

The sterically hindered phenol component of the stabilizer system may be any phenolic compound containing phenol groups which are sterically hindered by the presence of at least one alkyl substituent on the ring ortho to the hydroxyl group. In preferred compounds the alkyl groups contain 3 to 8 carbon atoms and tertiary alkyl groups such as the t-butyl group are the most preferred substituents. It is preferred that both positions ortho to the hydroxyl group in the ring contain tertiary alkyl group substituents. As is the case with the saturated acid component, the sterically hindered phenol component must be free of substituents which would substantially interfere with the performance of the stabilizer system or otherwise adversely affect the polymeric product. High molecular weight polymeric compounds containing sterically hindered groups can also be used in the invention as the sterically hindered phenol component. Representative of preferred sterically hindered phenols which are useful in the stabilizer system of the invention are 2-propyl-4 methylphenol; 2,6-di-t-butyl-4-methylphenol; 4-hydroxymethyl-2,6-di-t-butylphenol; 4,4-methylenebis (2,6-di-t-butylphenol); tetrakis methylene 3(3',5'-di-t-butyl-4'-hydroxyphenyl) propionate methane; octadecyl 3(3',5'-t-butyl-4'-hydroxyphenyl propionate); methylenebis (2-hydroxy-3-t-butyl-5-methylbenzene); 2-propyl-6 (1',1'-dimethyl butyl)-phenol; poly (3,5-di-t-butyl-4 hydroxy phenyl ethylene); etc.

The ratio of saturated carboxylic acid component to sterically hindered phenol component can vary from about 95:5 to 5:95. It is preferred that this ratio be about 4:1 to 1:4. The amount of total stabilizer components in the polymeric composition can vary from about 0.001 to 5%, based on the weight of polyurethane in the composition. The preferred amount of stabilizer components employed is preferably in the range of about 0.01 to 2%, based on the total weight of polyurethane in the composition.

The order of addition of the stabilizer components to the polyurethane composition is not critical. The components may be mixed separately and the mixture added to the polymeric composition, or they may be added to the composition separately in either order. If desired, one or both components may be added to the reaction mixture before or during the polymerization reaction. The stabilizer components are most conveniently added to the composition after polymerization is completed by blending the components with the polymeric composition.

Other additives such as fillers, extenders, plasticizers, coloring agents, other polymeric materials, etc. can be added to the polymeric composition being stabilized. These can be conveniently blended into the polymer composition after completion of the polymerization.

The following examples illustrate specific embodiments of the invention. Unless otherwise indicated, parts and percentages are on a weight basis.

EXAMPLE I

A thermoplastic polyurethane is prepared from the reaction of 30 mol % tetramethylene ether glycol, 20 mol % 1,4-butanediol and 50 mol % adipodi (nitrile carbonate) based on the total molar content of these 3 reactants. The catalyst for the reaction is 0.5 wt. % each of dibutyltin oxide and sodium stearate. The inherent viscosity of the resulting polymer, determined by adding 0.2 gms of polymer per 100 ml. DMF and determining inherent viscosity at 30°C, is 0.75.

Portions of this polymer are milled for 20 minutes on a rubber mill at 245°–250°F, and small samples are taken at different times to measure change in the inherent viscosity versus time of milling. The results of this study are reported in Table I.

EXAMPLE II

The procedure of Example I is repeated except that 0.5% octadecyl 3(3',5'-di-t-butyl 4'-hydroxy phenyl) propionate (anti-oxidant) is added to the polymer prior to milling. The results of this experiment are reported in Table I.

EXAMPLE III

The procedure of Example I is repeated except that 1% by weight of octadecyl 3(3',5'-di-t-butyl 4'-hydroxyphenyl) propionate (antioxidant) is added to the polymer prior to milling. The results of this experiment are reported in Table I.

EXAMPLE IV

The procedure of Example I is repeated except that 1% stearic acid is added to the polymer prior to milling. The results of this experiment are reported in Table I.

EXAMPLE V

The procedure of Example I is repeated except that 0.5% stearic acid and 0.5% octadecyl 3(3',5'-di-t-butyl 4'-hydroxyphenyl) propionate are added to the polymer prior to milling. The results are reported in Table I.

Examples I to V show the unexpected reduction in molecular weight loss obtained when 0.5% of stearic acid and 0.5% of a sterically hindered phenol are used as a stabilizer system in a polyurethane composition. Although 1% of the sterically hindered phenol improves the thermal stability of the polyurethane composition slightly over the use of 0.5% of the same phenol, the improvement in thermal stability obtained by adding 0.5% stearic acid to the 0.5% hindered phenol is considerably greater than when the hindered phenol and stearic acid are used alone at the same total weight of antioxidant and stearic acid.

EXAMPLE VI

A polyurethane composition is prepared according to the procedure of Example V except that a mixture of 0.5% of lauric acid and 0.5% of 4,4-methylenebis (2,6-di-t-butylphenol) is used as the stabilizer system in place of the stearic acid and octadecyl 3(3',5'di-t-butyl-4'-hydroxylphenol) propionate. The polymer will have improved thermal stability.

EXAMPLE VII

A thermoplastic polyurethane is prepared in accordance with the procedure of Example I except that 50 mol % of tolylene diisocyanate is used in place of the adipodi (nitrile carbonate). The resulting composition is then blended with 0.5% commercial stearic acid (containing 50% stearic acid, 45% palmitic acid and 5% oleic acid) and 0.5% 2,6 di-t-butyl-4-methylphenol. The resulting composition will exhibit improved thermal stability.

EXAMPLE VIII

A stabilized polyurethane composition is made by the procedure of Example VII except that the commerical grade stearic acid is replaced by 0.5% oxalic acid. The resulting polymeric composition will have improved thermal stability.

EXAMPLE IX

A stabilized polyurethane is made by the procedure of Example VII except that 0.5% of octane-1,8-dicarboxylic acid is substituted for the commerical grade stearic acid and 0.5% 4-hydroxymethyl-2,6-di-t-butylphenol is substituted for the 2,6-di-t-butyl-4-methylphenol. The resulting polymeric composition will have improved thermal stability.

EXAMPLE X

A stabilized polyurethane composition is made by the procedure of Example I except that 0.5% butyric acid is substituted for the stearic acid. The resulting polymeric composition will have improved thermal stability.

Although the invention is described with particular reference to specific embodiments, the scope of the invention is not limited thereto but is defined by the breadth of the appended claims.

the ratio of total carboxylic acid to sterically hindered phenol compound varying from about 1:19 to 19:1.

2. The composition of claim 1 wherein said mixture of carboxylic acid component and phenol component is present in an amount of about 0.01 to 2%, based on the total weight of polyurethane in the composition.

3. The composition of claim 1 wherein said carboxylic acid component is stearic acid.

4. The composition of claim 1 wherein said carboxylic acid component is predominantly a mixture of stearic and palmitic acids and contains up to 5%, based on the total weight of carboxylic acid component, of an ethylenically unsaturated carboxylic acid.

5. The composition of claim 1 wherein said sterically hindered phenol component is selected from the group consisting of:
  a. 2,6-di-t-butyl-4-methylphenol
  b. 4-hydroxymethyl-2,6-di-t-butylphenol
  c. 4,4-methylenebis (2,6-di-t-butylphenol)
  d. tetrakis methylene 3(3',5'-di-t-butyl-4'-hydroxyphenyl) propionate methane,
  e. octadecyl 3(3',5'-t-butyl-4'-hydroxyphenyl propionate),
  f. methylene-bis (2-hydroxyl-3-t-butyl-5-methylbenzene).

6. The composition of claim 5 wherein said polyurethane is prepared by the condensation-rearrangement reaction between (a) a cyclic nitrile compound having the structural formula:

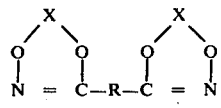

wherein R is a hydrocarbon radical containing 2 to 18 carbon atoms and X is carbonyl, sulfite or oxalyl and

TABLE I

| Time, min. | Example I No Additive | Inherent Viscosity vs. Time of Milling at 245–250°F | | | |
| | | Example II 0.5% Antioxidant | Example III 1.0% Antioxidant | Example IV 1% Stearic acid | Example V 0.5% Antioxidant and 0.5% Stearic acid |
| --- | --- | --- | --- | --- | --- |
| 0 | .75 | — | — | — | — |
| 2 | — | — | .77 | .66 | .79 |
| 4 | — | .74 | .74 | .62 | .77 |
| 5 | .703 | — | — | — | — |
| 6 | .69 | .74 | .72 | .60 | .80 |
| 8 | .67 | .64 | .72 | .58 | .76 |
| 10 | .66 | .75 | .72 | .57 | .76 |
| 12 | — | .73 | .68 | .53 | .77 |
| 13 | .48 | — | — | — | — |
| 14 | — | .68 | .69 | .61 | .75 |
| 15 | .49 | — | — | — | — |
| 16 | — | .64 | .68 | .57 | .72 |
| 18 | .43 | .65 | .66 | .53 | .73 |
| 20 | .33 | .63 | .69 | .48 | .74 |

What is claimed is:

1. A thermally stabilized organotin-containing polyurethane composition containing as the stabilizer about 0.001 to 5%, based on the weight of polyurethane in the composition, of a mixture containing a carboxylic acid component consisting of at least one carboxylic acid selected from the group consisting of lauric acid, palmitic acid, and stearic acid; and a sterically hindered phenol component containing at least one tertiary alkyl group in a position ortho to the ring hydroxyl group, (b) at least one organic polyol containing an average of about 2 hydroxyl groups per molecule and molecular weight of about 62 to 4000.

7. The composition of claim 6 wherein said cyclic nitrile compound is adipodi (nitrile carbonate) and said organic polyol is a polyether polyol or a polyester polyol having an average molecular weight of about 500 to 2000.

* * * * *